United States Patent [19]

Chi

[11] Patent Number: 5,517,520
[45] Date of Patent: May 14, 1996

[54] EXPANDABLE REPEATER

[75] Inventor: Chiou B. Chi, Hsinchu, Taiwan

[73] Assignee: Winbond Electronics Corp., Hsinchu, Taiwan

[21] Appl. No.: 276,644

[22] Filed: Jul. 15, 1994

[51] Int. Cl.⁶ .............................. H04B 3/36; H04B 17/02; H04L 25/20
[52] U.S. Cl. .......................... 375/212; 375/377; 375/211; 370/85.3; 370/94.3
[58] Field of Search ...................................... 375/211, 212, 375/377; 370/94.3, 85.1, 85.2, 85.3, 85.9, 85.11

[56] References Cited

U.S. PATENT DOCUMENTS

| 4,945,532 | 7/1990 | Hald | 370/85.3 |
| 5,265,123 | 11/1993 | Vijeh et al. | 375/3 |
| 5,430,762 | 7/1995 | Vijeh et al. | 375/211 |

*Primary Examiner*—Stephen Chin
*Assistant Examiner*—Don Vo
*Attorney, Agent, or Firm*—Christensen, O'Connor, Johnson & Kindness

[57] ABSTRACT

A repeater includes N repeater circuits coupled to integrator device in a star topology. Each of the N repeater circuits has an Input/Output port for transmitting a clock, data, control and collision signal. A request-for-access signal within the control signals is asserted as repeater circuit is requesting a data repetition. The integrator device has N Input/Output interfaces each of which is coupled to a corresponding Input/Output port, for selectively executing the data repetition and generating the collision signal, in response to the clock and control signals, so that the repeater functions as a single repeater.

6 Claims, 10 Drawing Sheets

EXPANDABLE REPEATER

TECHNICAL FIELD OF THE INVENTION

This invention relates to a repeater used in computer networks and, specifically, relates to a repeater having N monolithic repeater circuit and functioning as a single repeater under the specification of the IEEE 802.3 standard.

BACKGROUND OF THE INVENTION

Due to the rapid increase of the quantity of personal computer used in the modern society, computer network is a good solution to the demand of resources sharing between different data terminal equipment(DTE). Local Area Network (LAN) is one type of network among many different computer networks. In general, LAN has different topologies which include bus topology, star topology and ring topology. A star topology of the network system is disclosed in FIG. 1 for reference.

A commercial network system known as ETHERNET is a system which meets the IEEE 802.3 standard in which working characteristics for a Carrier Sense, Multiple Access-Collision Detection (CSMA/CD) network are specified. The CSMA/CD network allows a plurality of nodes to interface with the network through its controller. The nodes may be any type of data terminal equipment for transmitting data to another DTE. The controller prepares data and control information or conditions incoming data and control signals according to the specified protocol. The data and control information prepared become data and control signals which are independent of the actual transmission medium used including coaxial cable and twisted pair (TP) wiring. The Medium Attachment Unit (MAU) functions to translate these medium independent signals into signal types specific to a particular medium. An attachment unit interface connects the controller and the MAU. The IEEE 802.3 Standard specifically defines the controller, the protocol between the attachment unit interface and the MAU, and the attachment unit interface characteristics as well. The MAU includes interfaces for twisted pair medium through TP ports and for coaxial cable medium through AUI ports.

A repeater may connect to a bus, to which multiple nodes are coupled, at one of its ports if it includes an AUI port (coaxial MAU). To meet timing requirement outlined in the IEEE 802.3 Standard, a network has a maximum of four repeater units in any series from one node to any other node. However, each single chip repeater circuit has only a limit number of ports available due to limitation of drive current. Therefore the number of available ports on a single monolithic repeater circuit significantly limits the growth of the network. This is specially true for the star topology since per single port of the repeater circuit connects only to one data terminal equipment.

Therefore, a repeater device implemented in monolithic silicon having port expansion capability was devised. For instance, the U.S. Pat. No. 5,265,123, hereby expressly incorporated by reference for all purpose, discloses an expandable repeater. Also disclosed in the mentioned U.S. Patent is one embodiment including two or more Integrated Multiport Repeater (IMR) combined with each other to function as a single repeater unit through the utilization of an arbiter function.

SUMMARY OF THE INVENTION

The present invention provides a repeater including two or more integrated repeater circuits combined with each other to function as a single repeater unit by utilizing an integrator device.

The provided repeater includes N repeater circuits coupled to an integrator device in a star topology. Each of the N repeater circuits has an Input/Output port for transmitting a clock, data, control and collision signal. A request-for-access signal within the control signals is asserted as repeater circuit is requesting a data repetition.

The integrator device has N Input/Output interfaces each of which is coupled to a corresponding Input/Output port, for selectively executing the data repetition and generating the collision signal, in response to the clock and control signals, such that the repeater functions as a single repeater.

Reference to the remaining portions of the specification and drawings allows a further understanding of the spirit and advantage of the invention.

DETAILED DESCRIPTION OF THE PREFERRED EMBODIMENT

Figure 1:
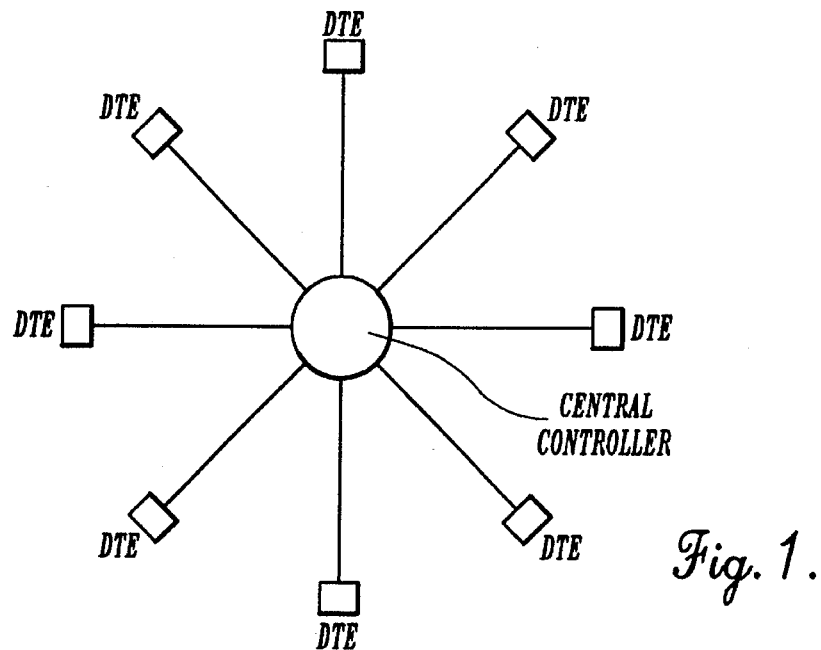
FIG. 1 discloses a network system in a star topology.
Figure 2:
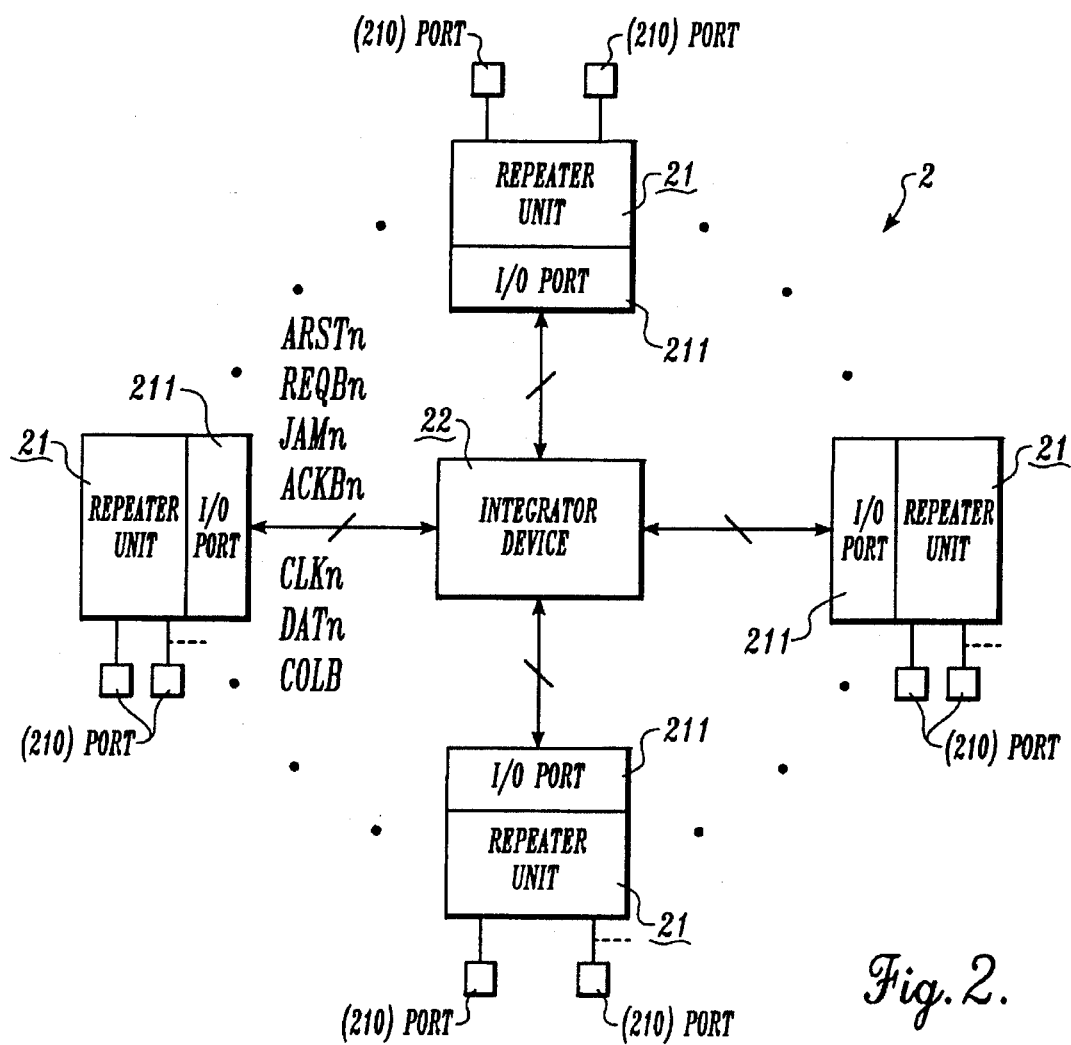
FIG. 2 depicts the system configuration of the repeater in accordance with the invention.

As shown in FIG. 2, the repeater 2 of the instant invention includes N data repeater unit 21 coupled to an integrator device 22 in a star topology.

Each data repeater unit 21 has an input/output port 211 for transmitting a clock signal (CLKn), a data (DATn), multiple control signals which include REQBn, JAMn, ACKBn, ARSTn and collision signal (COLB). The data repeater unit 21 mainly includes a state machine responsible for the necessary function of the IEEE 802.3 standard and the detailed specification of the state machine may be referred thereto.

CLKn, wherein n=1,2, . . . ,N, signal is the operation clock within the nth data repeater unit 21 which may be, in general, generated from an oscillator. The REQBn signal is a request-for-access signal of the nth data repeater unit when it intends to supply data for repetition to other data repeater unit. In a preferred embodiment, the REQBn is active low. Bidirectional JAMn line permits the repeater unit 21 requesting the access to inform the other repeater units of the presence of a collision in its repeater unit. And the information relayed over the DATA line while JAMn is asserted describes the collision type. In a preferred embodiment, the JAMn is active high. The ACKBn is a acknowledge signal which permits the data transmission of the nth data repeater unit 21 when its ACKBn being active low. With active low of the REQBn signal together with active low of the ACKBn signal, the corresponding nth data repeater unit 21 is allowed to transmit the data. On the other hand, with inactive high of the REQBn signal together with active low of the ACKBn signal, the corresponding nth data repeater unit 21 is allowed to receive the data. The active COLB signal informs all N data repeater units of an occurrence of data collision when at least two signal repeater units 21 intend to transmit the data onto DATn concurrently. The assertion of COLB signal prevents a requesting data repeater unit 21 from accessing the bus to drive the DATA line or the JAM line. In the preferred embodiment, the COLB signal is active low. When REQBn is active low and COLB is active low, the corresponding nth data repeater unit 21 would not transmit the data. When REQBn is inactive high and COLB is active low, the corresponding nth data repeater unit 21 would send a jamming sequence to all ports 210 coupled to the nth data repeater unit 21 per the IEEE 802.3 standard. The further details of the above described signals may be referred to the above mentioned U.S. Pat. No. 5,265,123. Furthermore, the ARSTn is an asynchronous reset signal for resetting the devices within the data repeater unit 21.

Figure 3:
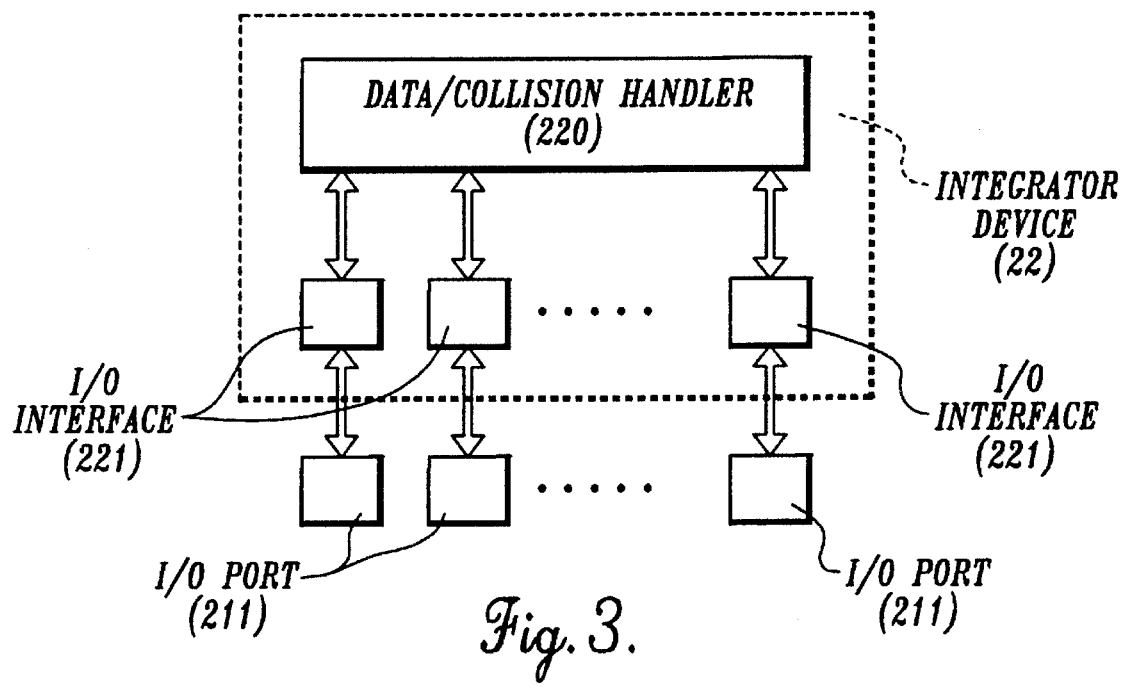
FIG. 3 is the functional block of the integrator device in FIG. 2.

The integrator device 22 of the invention, as shown in FIG.3, includes N input/output interfaces 221 and a data/collision handler 220. Each interface 221 couples to the data/collision handler 220 and connects to one corresponding input/output port 211. In response to the input control and status signals, the integrator device 22 selectively repeats the data on DATn line and informs of the occurrence of the data collision through the signals of GLBJAM and JAMn.

Figure 4:
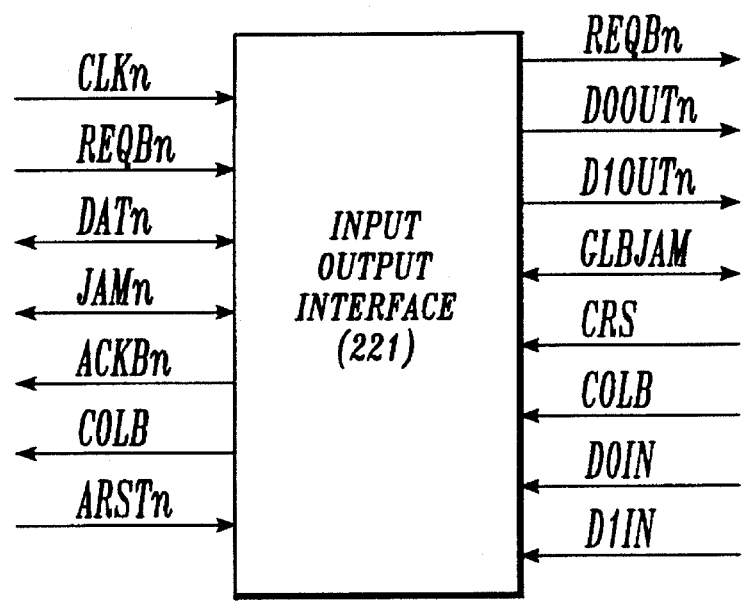
FIG. 4 shows the input/output signals of the input/output interface in FIG. 3.

As shown in FIG. 4, the input/output signals of the input/output interface 221 include CLKn, REQBn, DATn, JAMn, ACKBn, ARSTn, D0OUTn, D1OUTn, GLBJAM, CRS, COLB, D0IN, and D1IN signals. Wherein, n is equal to 1, or 2, . . . or N.

Figure 5:
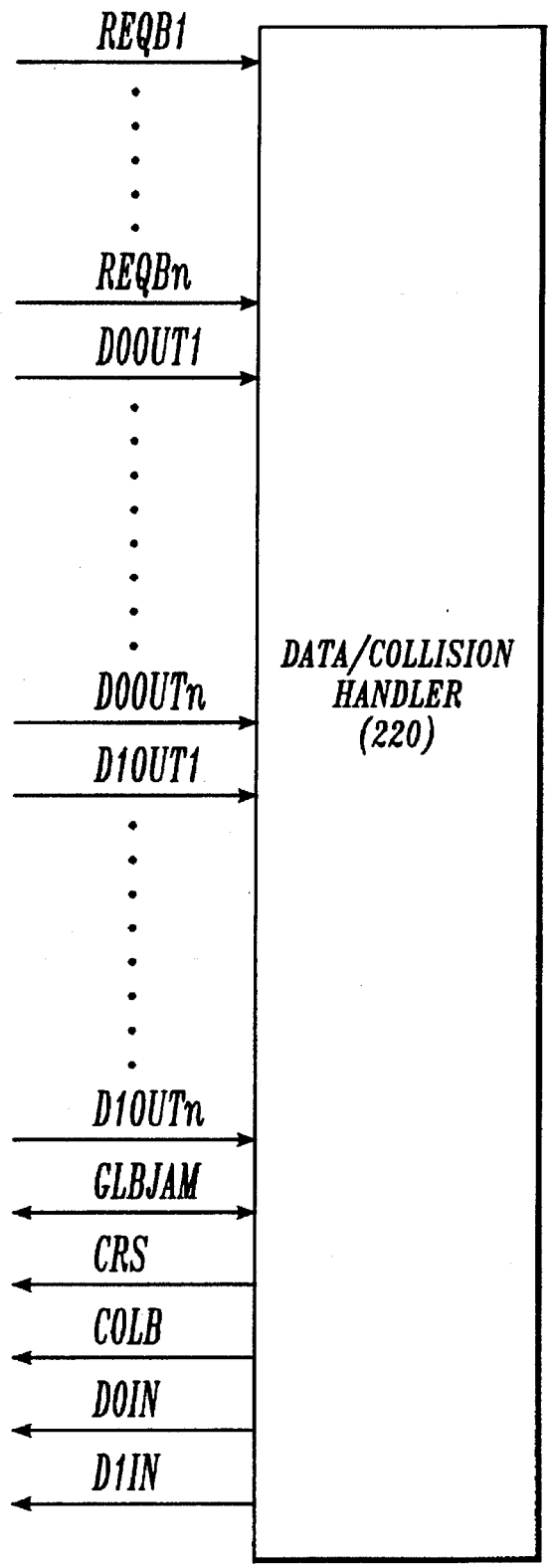
FIG. 5 shows the input/output signals of the data/collision handler device of the invention.

As shown in FIG. 5, the input/output signals of the data/collision handler 220 include REQB1 . . . REQBN, D0OUT1 D0OUTN, D1OUT1 . . . D1OUTN, GLBJAM, CRS, COLB, D0IN and D1IN signals.

The CLKn signal is the operation clock of the nth data repeater unit 210, the REQBn signal is the access-for-request signal which is active low, the DATn is the bidirectional line for data transmission, the JAMn is a signal indicative of data collision between a plurality of ports 210 within the nth data repeater unit 21 by which the other N–1 data repeater units may be notified of the presence of a collision, the ACKBn is an acknowledge signal, the COLB signal is an active low signal informing all N data repeater units 21 of an occurrence of data collision when at least two data repeater units 21 intend to transmit the data concurrently. The assertion of COLB signal prevents a requesting data repeater unit 21 from accessing the bus to drive the DATA line or the JAM line. The ARSTn is a reset signal. The CRS signal is pulled active low when at least one data repeater units 21 intend to access the data bus by driving its REQBn signal to active low. The GLBJAM line is used to transmit JAMn signal from one data repeater unit 21 to the JAMn lines of other data repeater unit 21.

Figure 6:
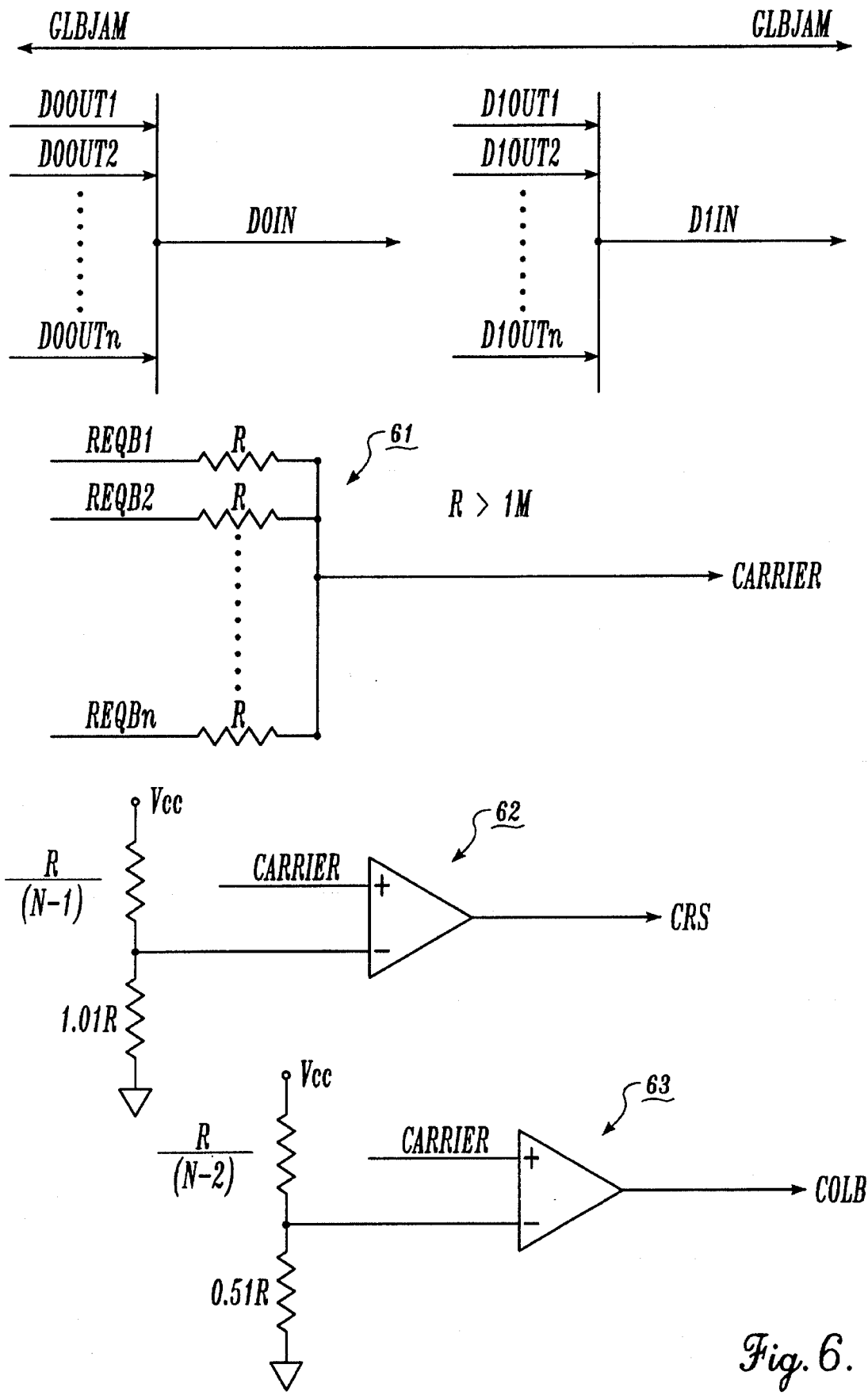
FIG. 6 depicts the preferred detailed circuit of the data/collision handler device of FIG. 5.

Referring to FIG. 6, the data/collision handler 220 of the integrator device 22 includes a resister circuit 61, a first comparison circuit 62, a second comparison circuit 63.

The resistor circuit 61 has N resistors each of which has a resistance of R. The first end of each resistor is adapted to receive one corresponding REQBn signal and the second end of each resistor is coupled to a common terminal for generating a first voltage signal CARRIER.

The first comparison circuit 62 compares the first voltage signal CARRIER with a first reference signal Vref1 and generates the repetition request signal CRS.

The second comparison circuit 63 compares the first voltage signal CARRIER with a second reference signal Vref2 and generates the data collision signal COLB.

The first reference signal Vref1 is generated at a terminal of a first voltage divider circuit having a first resistor of resistance R/(N–1) and a second resistor of 1.01 R. The first terminal of the first resistor is coupled to a reference voltage of Vcc and a second terminal of the second resistor is coupled to the ground voltage, and a second terminal of the first resistor and a first terminal of the second resistor are coupled together to form the terminal of the first voltage divider circuit, as shown in FIG. 6.

The second reference signal Vref2 is generated at a terminal of a second voltage divider circuit having a first resistor of resistance R/(N–2) and a second resistor of 0.51 R. The first terminal of the first resistor is coupled to a reference voltage of Vcc and a second terminal of the second resistor is coupled to the ground voltage, and a second terminal of the first resistor and a first terminal of the second resistor are coupled together to form the terminal of the second voltage divider circuit, as shown in FIG. 6.

From FIG. 6, it is shown N data lines D0OUT1 . . . D0OUTN are parallel connected to form DOIN line and N data lines D1OUT1 . . . D1OUTN are parallel connected to form D1IN line. The relationship between the DATn signal and DOIN, D1IN signals will be more clear thereinafter.

The REQB1 . . . , through REQBN are all inactive high, when there is no data to be transmitted, and the CARRIER signal is thereby high. When the CARRIER signal is high and greater than the value of Vref1, the CRS signal is inactive. As long as at least one REQBn is pulled active low, the voltage of the CARRIER signal thereby drops below the value of Vref1 and the CRS signal, as a result, changes to active state informing other devices of the access request. If at least two REQBn signals are pulled low concurrently, the voltage of the CARRIER signal will be even lower and smaller than Vref2 which activates the COLB signal informing other devices of the occurrence of the data collision. In a preferred embodiment, CLKn signal has a frequency value of 20 Mhz.

Figure 7A:
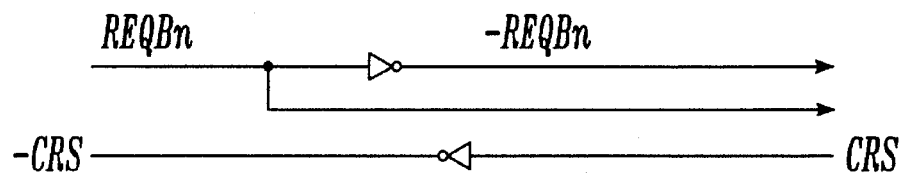
FIG. 7(A), 7(B) and 7(C) together constitutes the detailed circuit of the input/output interface of FIG. 4.
Figure 7A:
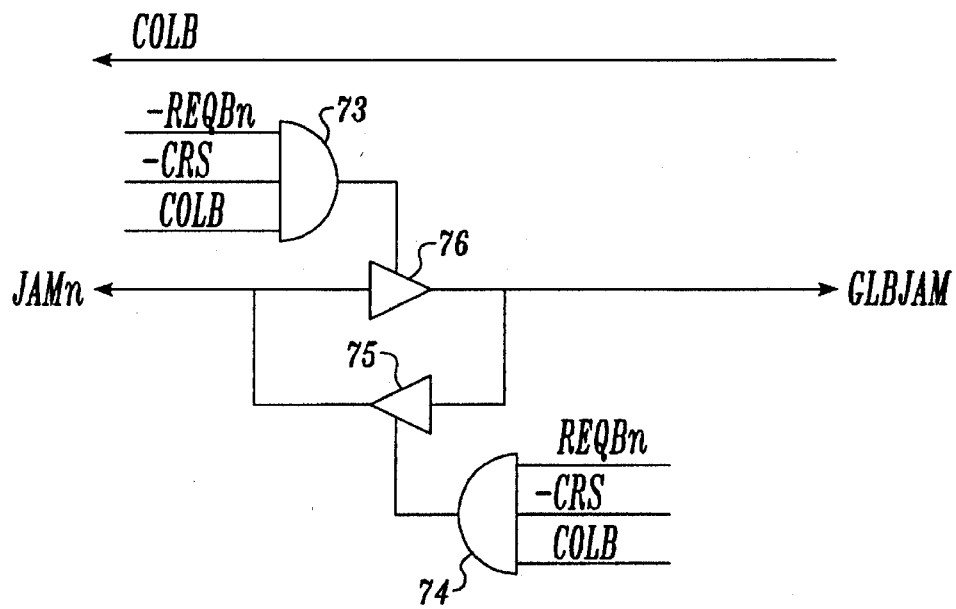
Figure 7A:
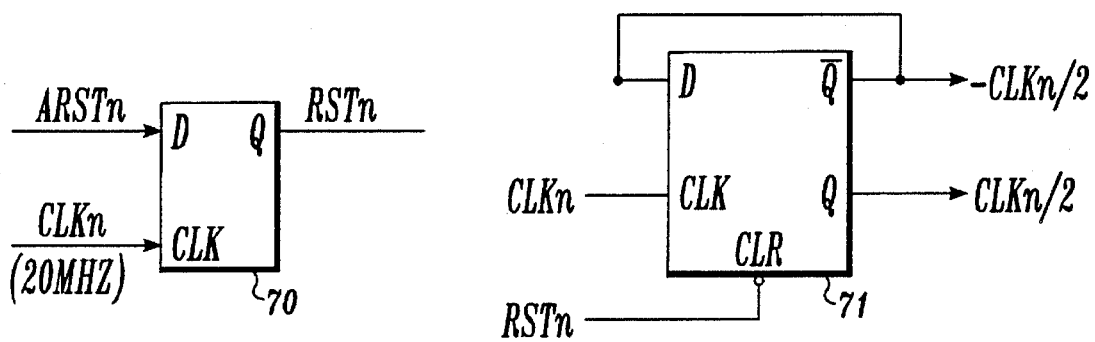
Figure 7A:
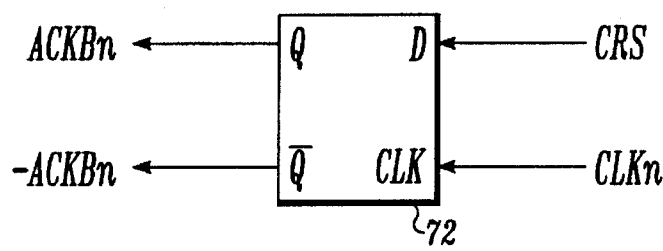

Referring to FIG. 7(a), ARSTn, ACKBn signal are used to generate a RSTn signal to reset the flip-flop 71. The flip-flop 71 functions as a frequency divider to generate a CLKn/2 and –CLKn/2 signal which respectively have frequency value of half of that of CLKn. The CRS and CLKn signals are used to generate the ACKBn signal through flip-flop 72. When –REQBn, –CRS and COLB signals are high, the status of JAMn signal is transmitted to GLBJAM line, and when REQBn, –CRS and COLB signals are high, the status of GLBJAM signal is transmitted to JAMn line.

Figure 7B:
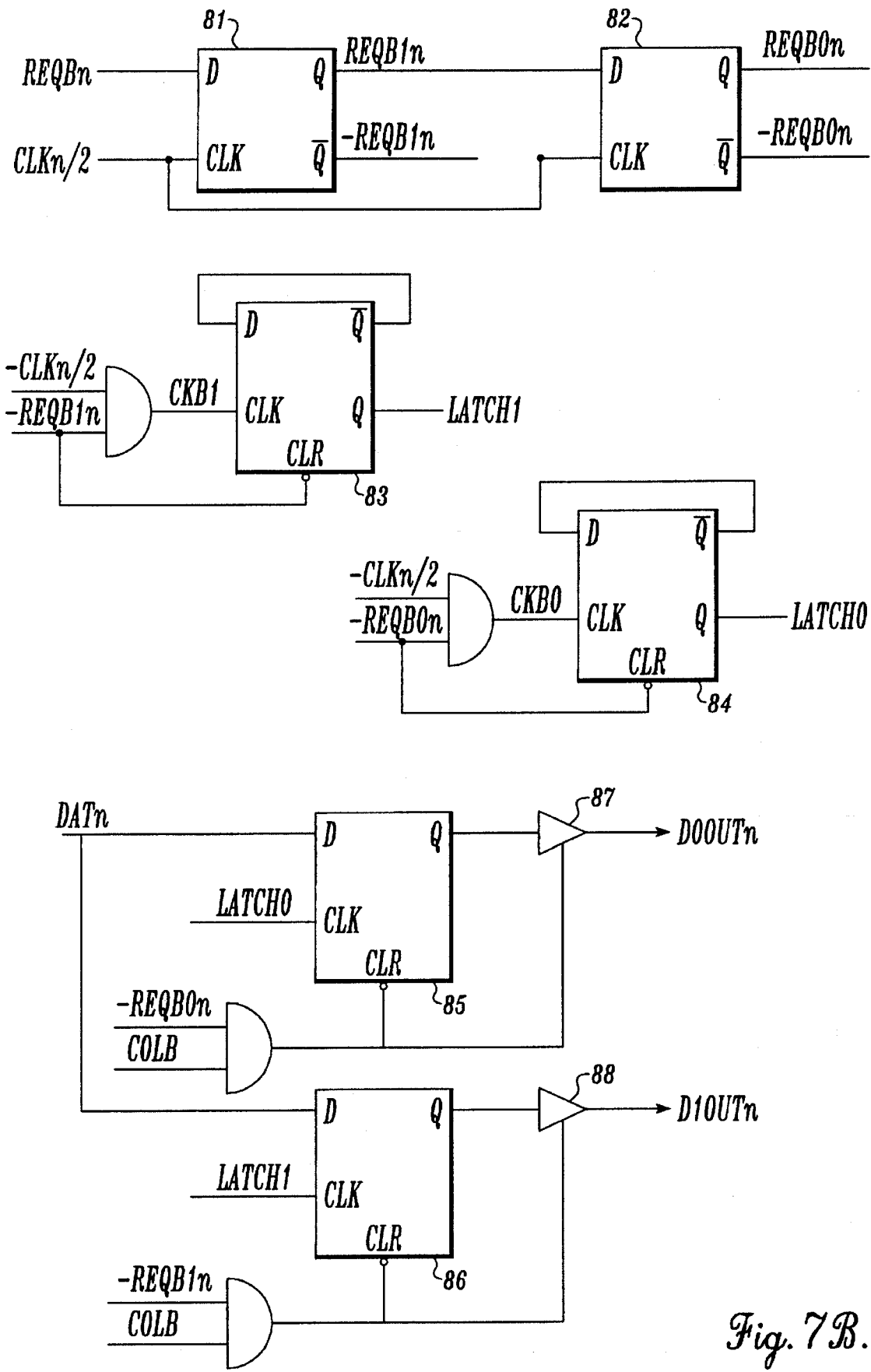

Referring to FIG. 7(b), the REQBn signal is used to generate REQB1n and –REQB1n signals by flip-flop 81, and the REQB1n signal is used to generate REQB0n and –REQB0n signals by flip-flop 82. The flip-flop 83 functions as frequency divider to generate the Latch1 signal through –CLKn/2 and –REQB1n signals. The flip-flop 84 functions as frequency divider to generate the Latch0 signal through –CLKn/2 and –REQB0n signals. When there is no access request, –REQB1n is low to clear the flip-flop 86. When there is an access request and no data collision occurring indicated by high level of COLB signal, the tri-state buffer 88 is enabled and DATn signal is transmitted to D1OUTn line as Latch1 signal is asserted. When there is no access request, −REQB0n and is low to clear the flip-flop 85. Similarly, when there is an access request and no data collision occurring indicated by high level of COLB signal, the tri-state buffer 87 is enabled and DATn signal is transmitted to D0OUTn line as Latch0 signal is asserted. Latch 1 and Latch 0 signals have frequency value half of that of −CLKn/2 signal respectively.

Figure 7C:
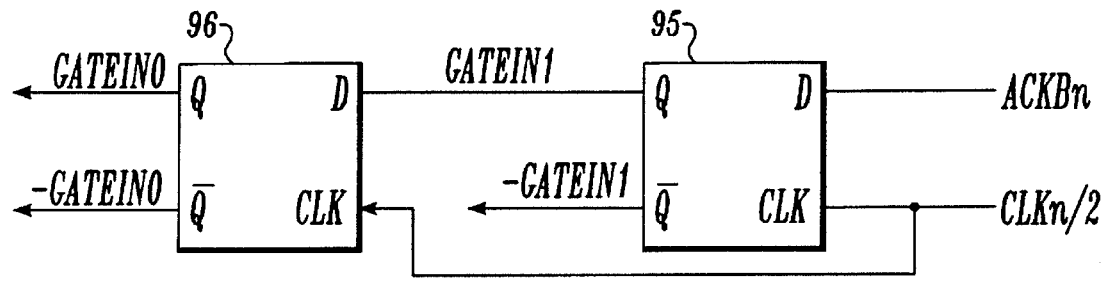
Figure 7C:
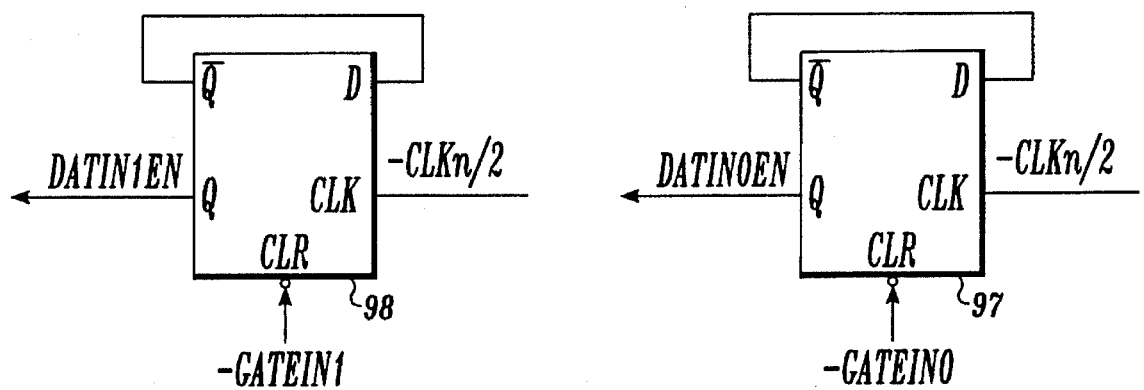
Figure 7C:
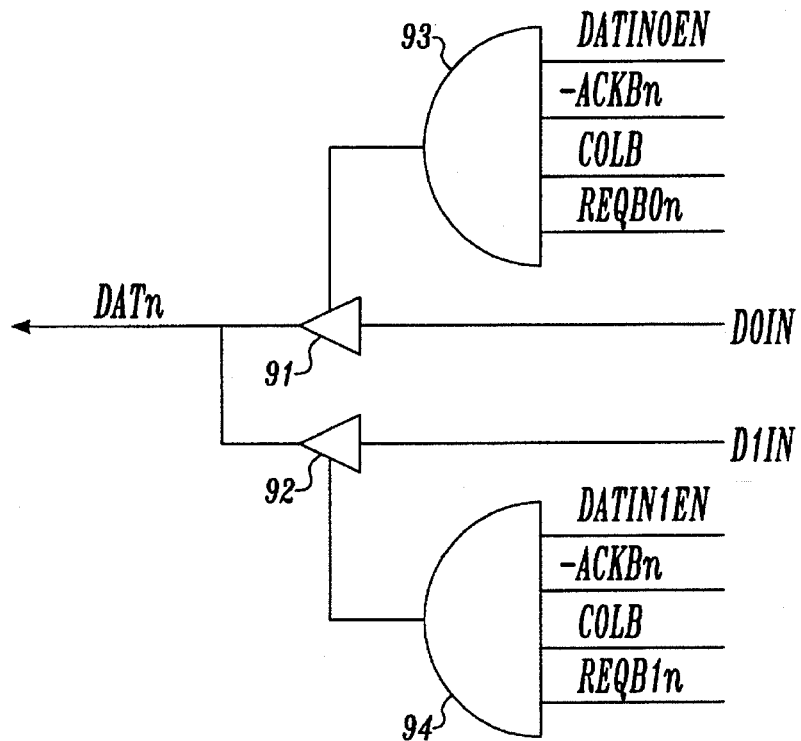

The D0OUTn and D1OUTn signals are transmitted respectively to input terminal of a tri-state buffer 91 and 92 of other input/output interfaces 221 in FIG. 7(c) through the D0IN and D1IN lines of the data/collision handler 220 in FIG. 6.

Referring to FIG. 7(c), ACKBn signal is used to generate GATEIN1 and −GATEIN1 signals through flip-flop 95, and GATEIN1 signal is used to generate GATEIN0 and −GATEIN0 signals through flip-flop 96. The −GATEIN0 and −GATEIN1 signals reset the flip-flop 97 and 98 respectively. The flip-flop 97 and 98 function as frequency divider to generate DATIN0EN and DATIN1EN signals respectively from the −CLKn/2 signal. The DATIN0EN and DATIN1EN signals have frequency value half of that of −CLKn/2.

When DATIN0EN, −ACKBn, COLB and REQB0n Signals are all high level, the tri-state buffer 91 is enabled to transmit the D0IN signal to DATn line. Afterwards, as DATIN1EN, −ACKBn, COLB and REQB1N are all high level, the tri-state buffer 92 is enabled to transmit the D1IN signal to DATn line.

Figure 8:
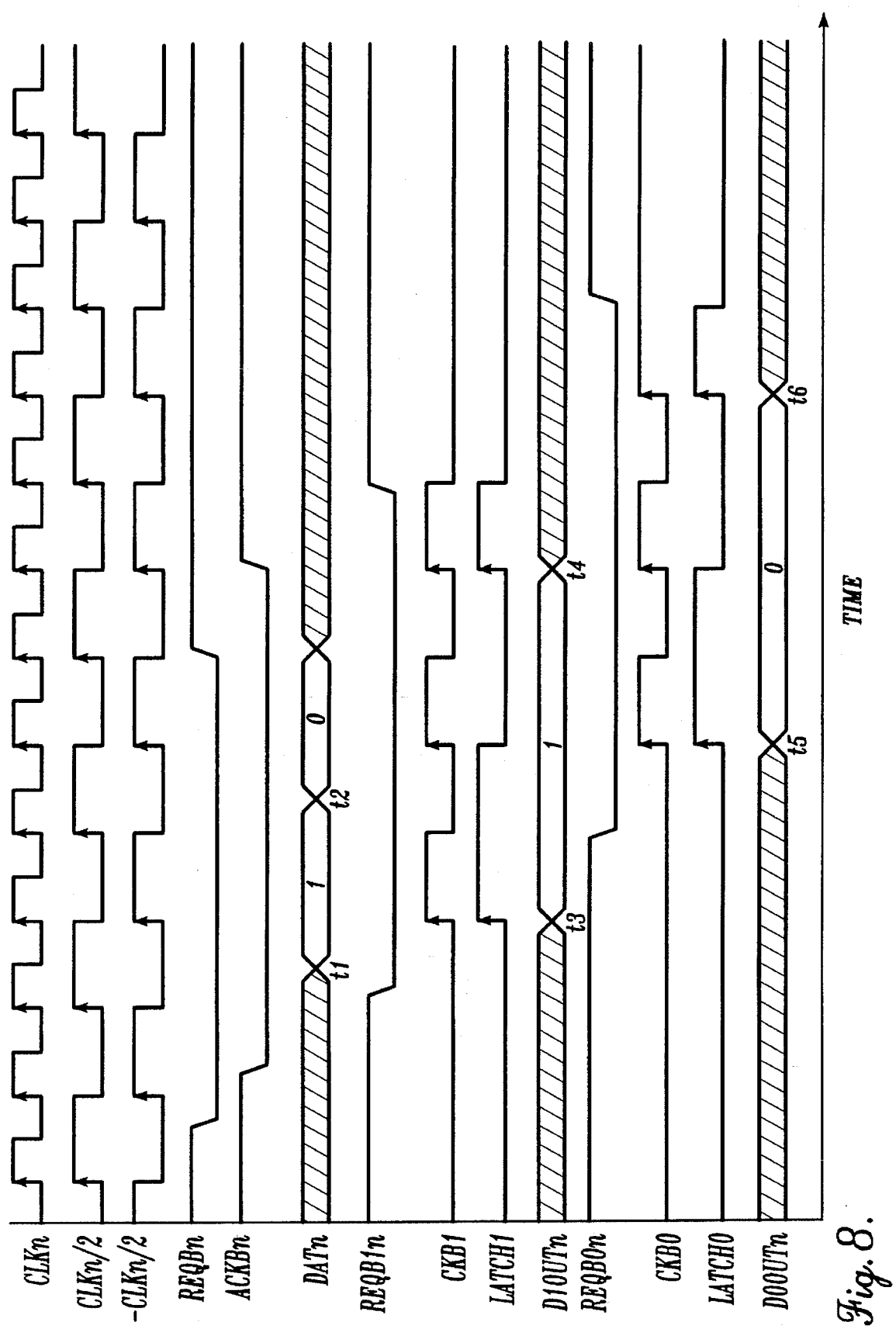
FIG. 8 discloses the timing diagram of the data transmission(send) of the nth data repeater.

FIG. 8 shows the timing diagram of a nth repeater unit which is allowed to transmitting the data. As shown in FIG. 8 wherein CLKn is the operating clock, at time point t1, t2, the data value 1 and 0 appear respectively. However, due to the function of the flip-flops 85 and 86, the data value 1 is stable for access on D1OUTn line between time point t3 and t4. And the data value 0 is stable for access on D0OUTn line between time point t5 and t6. In other words, the bit time of the data value stably existing has been doubled.

Figure 9:
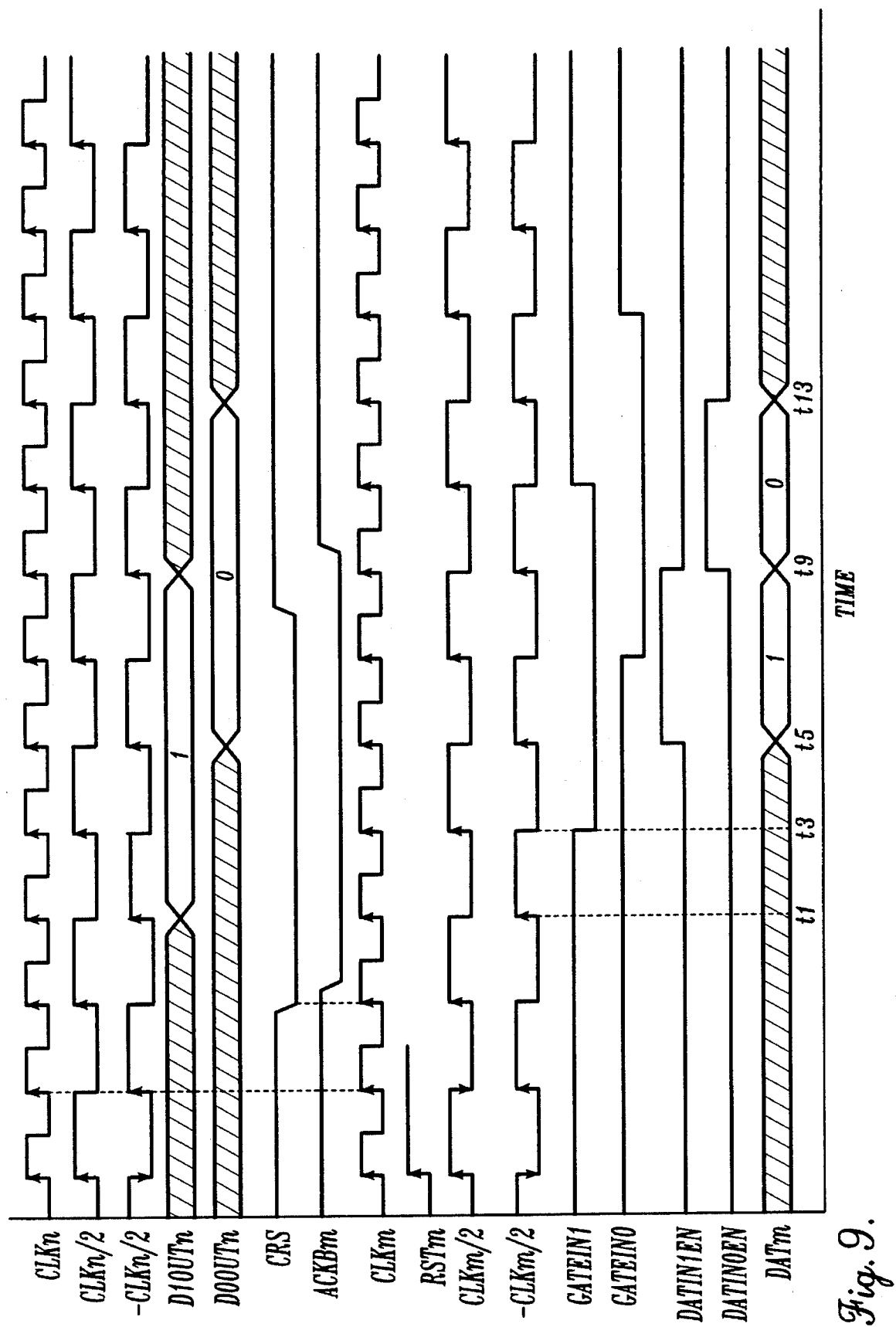
FIG. 9 discloses the timing diagram of the mth data repeater when receiving the data under the worst case, wherein CLKm and CLKn have a maximum phase difference.
Figure 10:
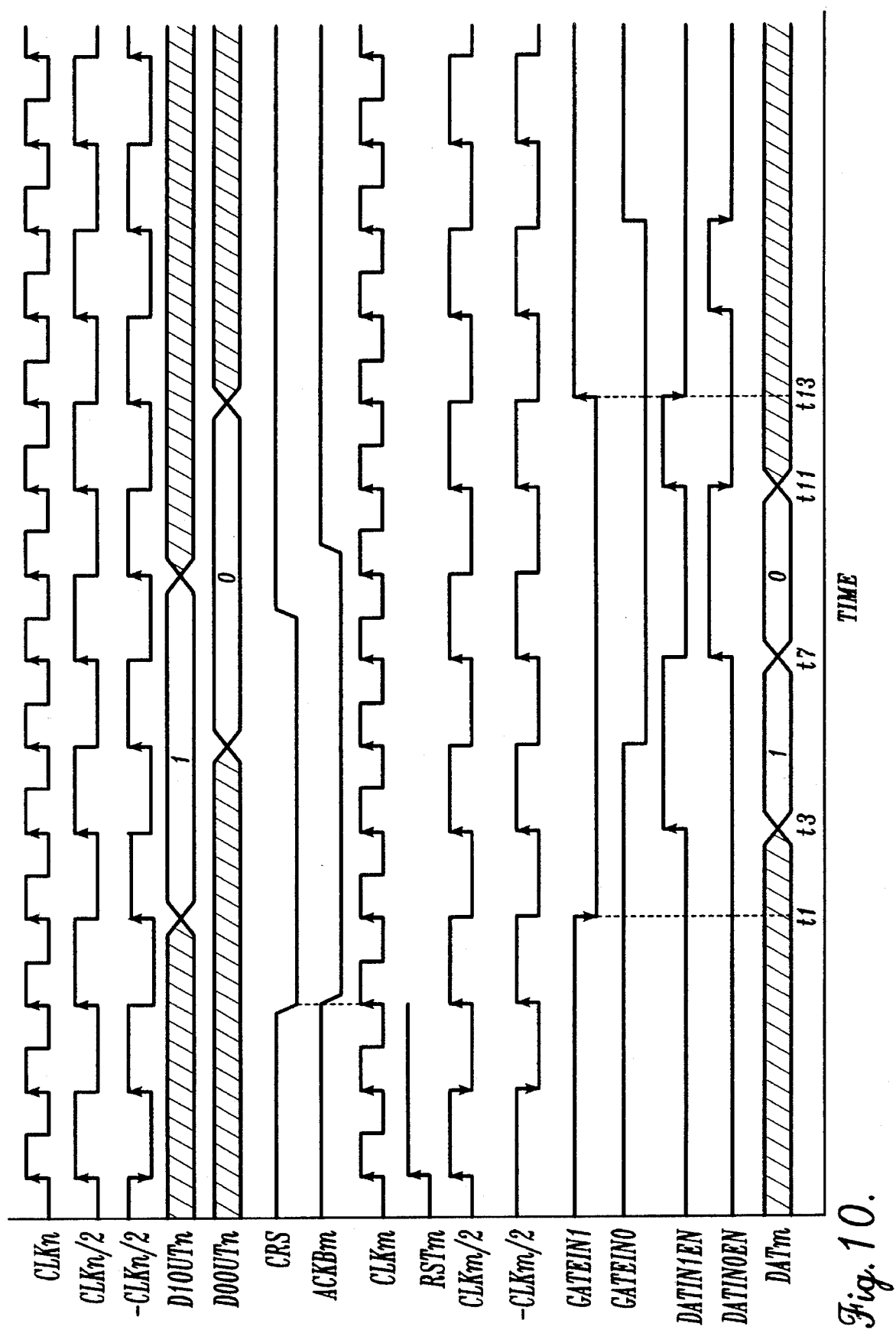
FIG. 10 discloses the timing diagram of the mth data repeater when receiving the data under the best case, wherein CLKm and CLKn have a zero phase difference.

FIG. 9 and 10 disclose the timing diagram of data receive of the mth data repeater unit when the data appears on the D1OUTn and D0OUTn lines in FIG. 8. FIG. 9 discloses a worst case, wherein the CLKm signal has a maximum phase difference from CLKn signal, in which the mth data repeater unit has minimum data repetition time, and FIG. 10 discloses a best case, wherein the CLKm signal is in phase with CLKn signal, in which the mth data repeater unit has a maximum data repetition time, in accordance with the IEEE 802.3 standard for single repeater unit.

Under the worst case of FIG. 9, the mth data repeater unit completes repeating the data value 1 at t9 which is very close to the time point at which the D1OUTn line begins to lose the data value 1, and completes repeating data value 0 at t13 which is very close to the time point at which the D0OUTn line begins to lose the data value 0.

Under the best case of FIG. 10, the mth data repeater unit completes repeating the data value 1 at t7 which is well before the time point at which the D1OUTn line begins to lose the data value 1, and completes repeating the data value 0 at t11 which is well before the time point at which the D0OUTn line begins to lose the data value 0.

From the aforesaid, through the implementation of the present invention, even there exists a phase difference of the operating clock between different data repeater units, the expandable repeater of the invention still meet the specification of the IEEE 802.3 standard for a single repeater unit. In other words, the expandable repeater of the invention having N integrated repeater units may still be regarded as single repeater unit under the IEEE 802.3 standard.

What is claimed is:

1. A repeater, comprising:

N repeater circuits, each of the N repeater circuits having an Input/Output port for transmitting a clock, data, control and collision signal, a request-for-access signal within the control signals being asserted as repeater circuit is requesting a data repetition:

an integrator means having N Input/Output interfaces each of which being coupled to the corresponding Input/Output port of said N repeater circuits, for selectively executing the data repetition and generating the collision signal, in response to the clock and control signals, so that said repeater functions as a single repeater, the integrator means comprising a data/collision handler, in response to the request-for-access signal of each Input/Output port, for generating a repetition request signal and the collision signal, wherein the data/collision handler comprises:

a resistor circuit having N resistors each of which have a resistance of R, a first end of each resistor being adapted to receive one corresponding request-for-access signal, a second end of each resistor being coupled to a common terminal for generating a first voltage signal;

a first means for generating the repetition request signal by comparing the first voltage signal with a first reference signal; and a second means for generating the collision signal by comparing the first voltage signal with a second reference signal.

2. The repeater as claimed in claim 1, wherein the first reference signal is generated at a terminal of a first voltage divider circuit having a first resistor of resistance R/(N−1) and a second resistor of 1.01R, a first terminal of the first resistor being coupled to a reference voltage of Vcc and a second terminal of the second resistor being coupled to the ground voltage, and a second terminal of the first resistor and a first terminal of the second resistor being coupled together to form the terminal of the first voltage divider circuit.

3. The repeater as claimed in claim 1, wherein the second reference signal is generated at a terminal of a second voltage divider circuit having a first resistor of resistance R/(N−2) and a second resistor of 0.51R, a first terminal of the first resistor being coupled to a reference voltage of Vcc and a second terminal of the second resistor being coupled to the ground voltage, and a second terminal of the first resistor and a first terminal of the second resistor being coupled together to form the terminal of the second voltage divider circuit.

4. The repeater as claimed in claim 1, wherein each repeater circuit is coupled to a plurality of node equipments.

5. The repeater as claimed in claim 1, wherein the data are repeated asynchronously between N repeater circuits operated by clock signals with different phase relationship to each other.

6. The repeater as claimed in claim 1, wherein the Input/Output interface having means for doubling the bit time of the data signal.

\* \* \* \* \*